(12) United States Patent
Vallamkondu et al.

(10) Patent No.: US 12,710,440 B2
(45) Date of Patent: Aug. 18, 2026

(54) FABRY-PEROT BASED SPEED SENSOR

(71) Applicant: Rosemount Aerospace Inc., Burnsville, MN (US)

(72) Inventors: Aswin Kumar Vallamkondu, Banglore (IN); Ramesh Annamareddy, Banglore (IN); Mark Sherwood Miller, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 1347 days.

(21) Appl. No.: 17/403,827

(22) Filed: Aug. 16, 2021

(65) Prior Publication Data

US 2022/0252631 A1 Aug. 11, 2022

(30) Foreign Application Priority Data

Feb. 8, 2021 (IN) ............................ 202141005206

(51) Int. Cl.
*G01P 3/36* (2006.01)
*G01J 3/26* (2006.01)
*G01P 3/44* (2006.01)

(52) U.S. Cl.
CPC .................. *G01P 3/36* (2013.01); *G01J 3/26* (2013.01); *G01P 3/44* (2013.01)

(58) Field of Classification Search
CPC .................................. G01P 3/36; G01P 3/44; G01J 3/26
See application file for complete search history.

(56) References Cited

U.S. PATENT DOCUMENTS

| | | | |
|---|---|---|---|
| 3,864,041 | A | 2/1975 | Long |
| 4,746,791 | A | 5/1988 | Forkel |
| 9,069,004 | B2 | 6/2015 | Bhave et al. |
| 2017/0067928 | A1 | 3/2017 | Wood et al. |

FOREIGN PATENT DOCUMENTS

| | | | | |
|---|---|---|---|---|
| CN | 111596238 A | 8/2020 | | |
| DE | 3844294 A1 * | 7/1990 | ............. | G01P 3/488 |
| GB | 2260400 A | 4/1993 | | |

OTHER PUBLICATIONS

The Engineering ToolBox (2012). Materials—Light Reflecting Factors. [online] Available at: https://www.engineeringtoolbox.com/light-material-reflecting-factor-d_1842.html [Accessed Day Month Year]. (Year: 2012).*

(Continued)

*Primary Examiner* — Helal A Algahaim
*Assistant Examiner* — Clara G Chilton
(74) *Attorney, Agent, or Firm* — Kinney & Lange, P.A.

(57) ABSTRACT

Apparatus and associated methods relate to optically determining rotation frequency of a rotatable member using a Fabry-Perot cavity formed between a mirror and a movable reflective mirror. A cavity dimension between the mirror and a movable reflective mirror changes in response to movement of the movable reflective mirror. The movable reflective mirror is bonded to a magneto-strictive material having a thickness dimension that changes in response to changes in a magnetic field. A magnet generates the magnetic field, which changes in response to rotation of the rotatable member.

18 Claims, 4 Drawing Sheets

(56) References Cited

OTHER PUBLICATIONS

Ki Dong Oh, J. Ranade, V. Arya, A. Wang and R. O. Claus, "Optical fiber Fabry-Perot interferometric sensor for magnetic field measurement," in IEEE Photonics Technology Letters, vol. 9, No. 6, pp. 797-799, Jun. 1997 (Year: 1997).*

Extended European Search Report dated Jun. 2, 2022 for corresponding European Application No. 22150139.

Oh K D et al., "Optical Fiber Fabry-Perot Interferometric Sensor for Magnetic Field Measurement", IEEE Photonics Technology Letters, IEEE, USA vol. 9, No. 6, Jun. 1997, pp. 797-799.

* cited by examiner

FABRY-PEROT BASED SPEED SENSOR

BACKGROUND

Speed sensors are used in a variety of applications and for a variety of purposes. For example, speed sensors are used and for a variety of purposes in aircraft engines. Some speed sensors sense a changing magnetic field to indicate speed, which can be caused by rotation of a rotating member through a magnetic field. Many of such magnetic-field sensing sensors employ an inductive coil in which the changing magnetic field induces a signal. Such inductive coils, however, can be sensitive to other electromagnetic fields in the environment, such as, for example, electromagnetic fields caused by electrical circuits and systems nearby. Furthermore, for many aircraft engine applications, such inductive coils are located in very high-temperature environments and/or environments with corrosive chemicals. Such applications can cause degradation of the inductive coils themselves, and/or other related components. Should such degradation cause failure of the inductive coil, the speed sensor that uses that inductive coil can be rendered inoperative. Furthermore, it can be difficult to predict when such inductive coils fail, therefore, failure of such an associated speed sensor can give little or no warning. In such harsh environments, it would be desirable to use speed sensors that are not sensitive to stay electromagnetic radiation and are not so easily corroded in corrosive environments.

SUMMARY

Apparatus and associated methods relate to a system for determining rotation frequency of a rotatable member. The system includes a magnet, a Fabry-Perot cavity, a light source, a detector, and a speed calculator. The magnet generates a magnetic field proximate the rotatable member. Rotation of the rotatable member causes changes in the magnetic field generated by the magnet. The Fabry-Perot cavity is formed between a first mirror and a second mirror. The second mirror is bonded to a magneto-strictive material having a thickness dimension that changes in response to changes in the magnetic field caused by rotation of the rotatable member, thereby moving the second mirror relative to the first mirror. The light source is configured to project light into the Fabry-Perot cavity. The detector is configured to detect light reflected from the Fabry-Perot cavity. The speed calculator is configured to determine rotation frequency of the rotatable member based on a principal wavelength of light detected by the detector.

Some embodiments relate to a method for determining rotation frequency of a rotatable member. A magnetic field proximate the rotatable member is generated, via a magnet. Rotation of the rotatable member causes changes in the magnetic field generated by the magnet. The second mirror of the Fabry-Perot cavity is moved, via a magneto-strictive material, in response to the changes in the magnetic field caused by rotation of the rotatable member. Light is projected, via a light source, into Fabry-Perot cavity formed between a first mirror and the second mirror. A reflected portion of the light projected into the Fabry-Perot cavity is reflected, via the Fabry-Perot cavity. The light reflected from the Fabry-Perot cavity is detected, via a detector, Rotation frequency of the rotatable member is determined, via a speed calculator, based on a principal wavelength of light detected by the detector.

DETAILED DESCRIPTION

Apparatus and associated methods relate to optically determining rotation frequency of a rotatable member using a Fabry-Perot cavity formed between a first mirror and a second mirror. A cavity dimension between the first mirror and a second mirror changes in response to movement of the second mirror with respect to the first mirror. The second mirror is bonded to a magneto-strictive material having a thickness dimension that changes in response to changes in a magnetic field. A magnet generates the magnetic field, which changes in response to teeth of a toothed phonic wheel passing through the magnetic field. Rotation of the rotatable member, which is coupled to the toothed phonic wheel, causes the teeth to pass through the magnetic field.

Figure 1:
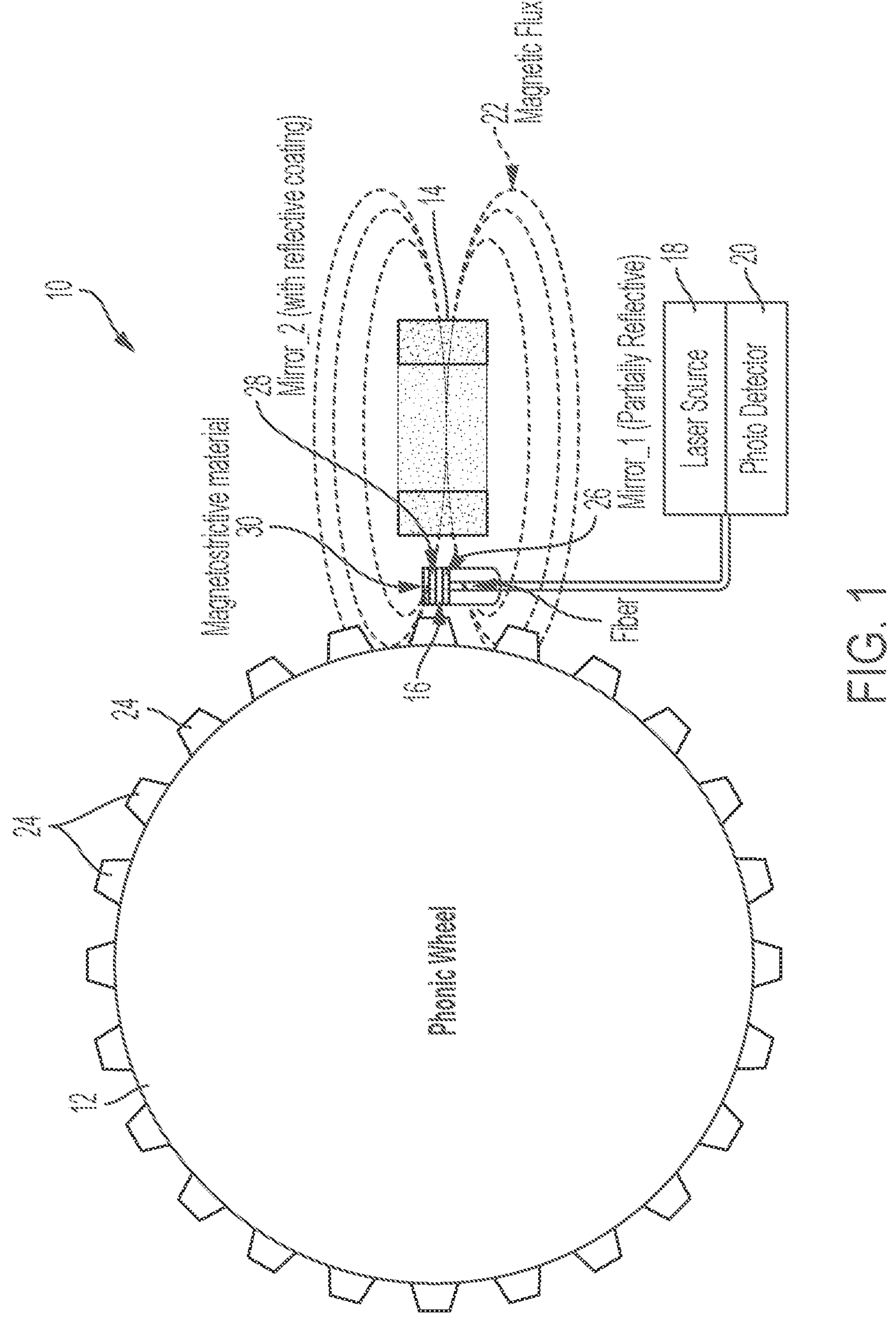
FIG. 1 is a schematic diagram of a Fabry-Perot based speed sensor.

FIG. 1 is a schematic diagram of a Fabry-Perot based speed sensor. In FIG. 1, Fabry-Perot based speed sensor 10 is aligned with toothed phonic wheel 12, which can be coupled to a rotatable member, such as, for example, a shaft of an airplane engine (not depicted). Fabry-Perot based speed sensor 10 includes magnet 14, Fabry-Perot cavity 16, light source 18, and detector 20. Magnet 14 is shown generating magnetic field 22 proximate toothed phonic wheel 12. As teeth 24 of toothed phonic wheel 12 rotate through magnetic field 22, teeth 24 cause magnetic field 22 to change as teeth 24 sweep through the magnetic flux lines of magnetic field. Such changes to magnetic field 22 are caused when a magnetic permeability of teeth 24 is different from the magnetic permeability of free space, for magnetic field 22 is preferentially directed into high-permeability materials. Thus, to increase the changes in the magnetic field caused by movement of teeth 24 past magnet 14, phonic wheel (or at least teeth 24 of phonic wheel) 12 can be made of a high permeability material.

Fabry-Perot cavity 16 is situated or located between magnet 14 and toothed phonic wheel 12, such that Fabry-Perot cavity is within a region of magnetic field 22 that changes in response to relative location of teeth 24 of toothed phonic wheel 12. Such a location of Fabry-Perot cavity 16 is a location where changes to magnetic field 22, which are caused by motion of teeth 24 past magnet 14, are greatest. Fabry-Perot cavity 16 is formed between first mirror 26 and second mirror 28. A cavity dimension of Fabry-Perot cavity changes in response to relative movement between first mirror 26 and second mirror 28, as will be shown in more detail below. Second mirror 28 is bonded to magneto-strictive material 30 having a thickness dimension that changes in response to changes in magnetic field 22. Magneto-strictive material 30 is also coupled to a fixed member on a side opposite to the side bonded to second mirror 28, such that changes in the thickness dimension caused by changes in magnetic field 22 result in movement of second mirror 28. The fixed member is fixed relative to first mirror 26, thereby ensuring that changes to the thickness dimension of magneto-strictive material 30 result in relative movement between first mirror 26 and second mirror 28.

The principal of operation of Fabry-Perot speed sensor 10 is that rotation of phonic wheel 12 proximate magnet 14 causes changes in magnetic field 22 therebetween, where Fabry-Perot cavity 16 is located. Changes in magnetic field 22 causes dimensional changes to magneto-strictive material 30. The dimensional changes to magneto-strictive material 30 causes movement of second mirror 28. Movement of second mirror 28 causes dimensional cavity changes of Fabry-Perot cavity 16. Dimensional cavity changes of Fabry-Perot cavity 16 causes changes in metrics of light reflected thereby. Thus, the metrics of the light reflected by Fabry-Perot cavity 16 are indicative of rotational speed of phonic wheel 12, and thereby indicative of speeds of any member axially connected thereto, such as, for example, a shaft of an aircraft engine.

Figure 2B:
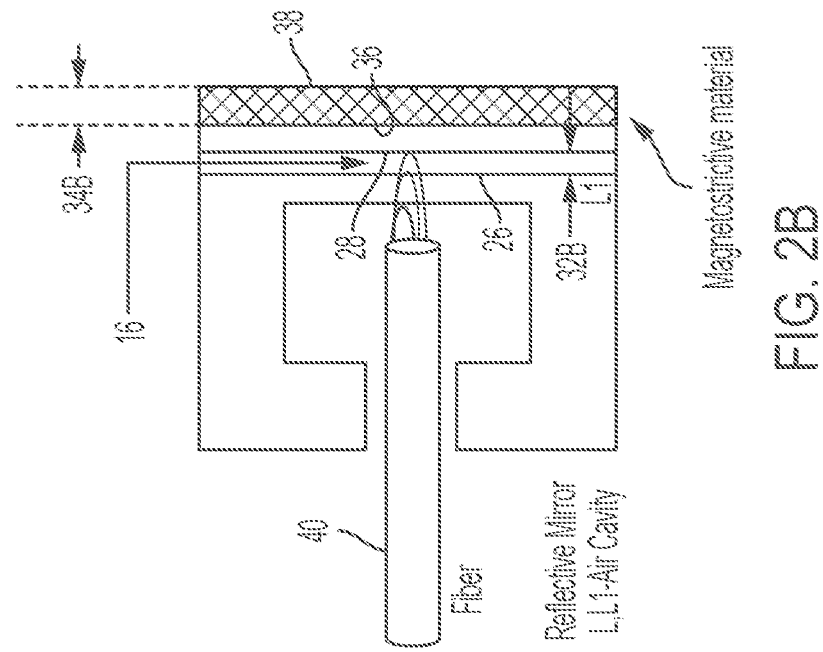
FIGS. 2A and 2B are schematic diagrams of a Fabry-Perot cavity in two different magnetic fields.
Figure 2A:
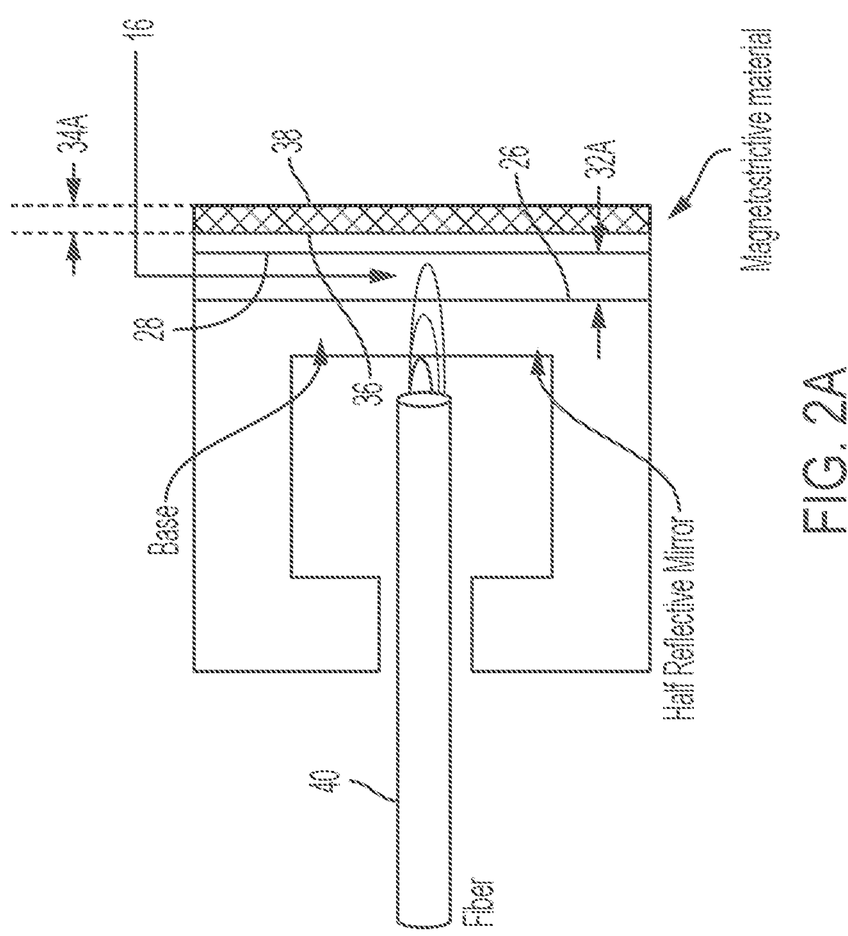

FIGS. 2A and 2B are schematic diagrams of a Fabry-Perot cavity in two different magnetic fields. In FIGS. 2A and 2B, portions of Fabry-Perot based speed sensor 10, which is depicted in FIG. 1, are shown in more detail, and in two different magnetic field conditions. In FIG. 2A, Fabry-Perot cavity 16 has a relatively-large cavity dimension 32A, which results from a first magnetic field condition. Such a relatively-large cavity dimension 32A of Fabry-Perot cavity 16 results from magneto-strictive material 30 having a relatively-small thickness dimension 34A. Magneto-strictive material 30 is bonded to a fixed structure at first side 36 and bonded to second mirror 28 at second side 38. The fixed structure to which magneto-strictive material 30 is bonded is fixed relative to first mirror 26, such that cavity dimension 32A can change in response to changes in thickness dimension 34A. Cavity dimension 32A determines various wavelengths at which constructive interference of light can occur therewithin, as well as wavelengths at which destructive interference of light can occur therewithin. At such wavelengths corresponding to such constructive interference, light is well reflected from Fabry-Perot cavity 16. At wavelengths corresponding to destructive interference, light is poorly reflected from Fabry-Perot cavity 16. Thus, the spectral response of the light reflected by Fabry-Perot cavity 16 is indicative of cavity dimension 32A. Both thickness dimension 34A and cavity dimension 32A are measured in a direction orthogonal to both first mirror 26 and second mirror 28, which are parallel to one another.

In FIG. 2B, Fabry-Perot cavity 16 has a relatively small cavity dimension 32B, which results from a second magnetic field condition. Such a relatively small cavity dimension 32B of Fabry-Perot cavity 16 results from magneto-strictive material 30 having a relatively large thickness dimension 34B. Because the fixed structure to which magneto-strictive material 30 is bonded is fixed relative to first mirror 26, such that cavity dimension 32B can change in response to changes in thickness dimension 34B. Cavity dimension 32B determines a wavelength different from the one determined by cavity dimension 32A at which constructive interference of light can occur therewithin. At such a wavelength corresponding to such constructive interference, light is again preferentially reflected from Fabry-Perot cavity 16. Thus, the wavelength that such preferential reflection occurs is indicative of cavity dimension 32B. Both thickness dimension 34B and cavity dimension 32B are again measured in a direction orthogonal to both first mirror 26 and second mirror 28, which are parallel to one another.

In the depicted embodiment, optical fiber 40 both transmits the light generated by light source 18 (depicted in FIG. 1) from light source 18 to Fabry-Perot cavity 16 and transmits the light reflected from Fabry-Perot cavity 16 to detector 18 (depicted in FIG. 1). First mirror 26 is partially reflective so as to enable light to transmit therethrough. Incident light is transmitted by optical fiber 40 through first mirror 26 into Fabry-Perot cavity 16. Then light reflected by Fabry-Perot cavity 16 is transmitted from within Fabry-Perot cavity through first mirror 26 and into optical fiber 40. The reflectivity of first mirror 26 and second mirror 28 determine the finesse of Fabry-Perot cavity 16. The finesse of the Fabry-Perot cavity 16 affects fine structure of the spectral response of light reflected from Fabry-Perot cavity 16.

Figure 3:
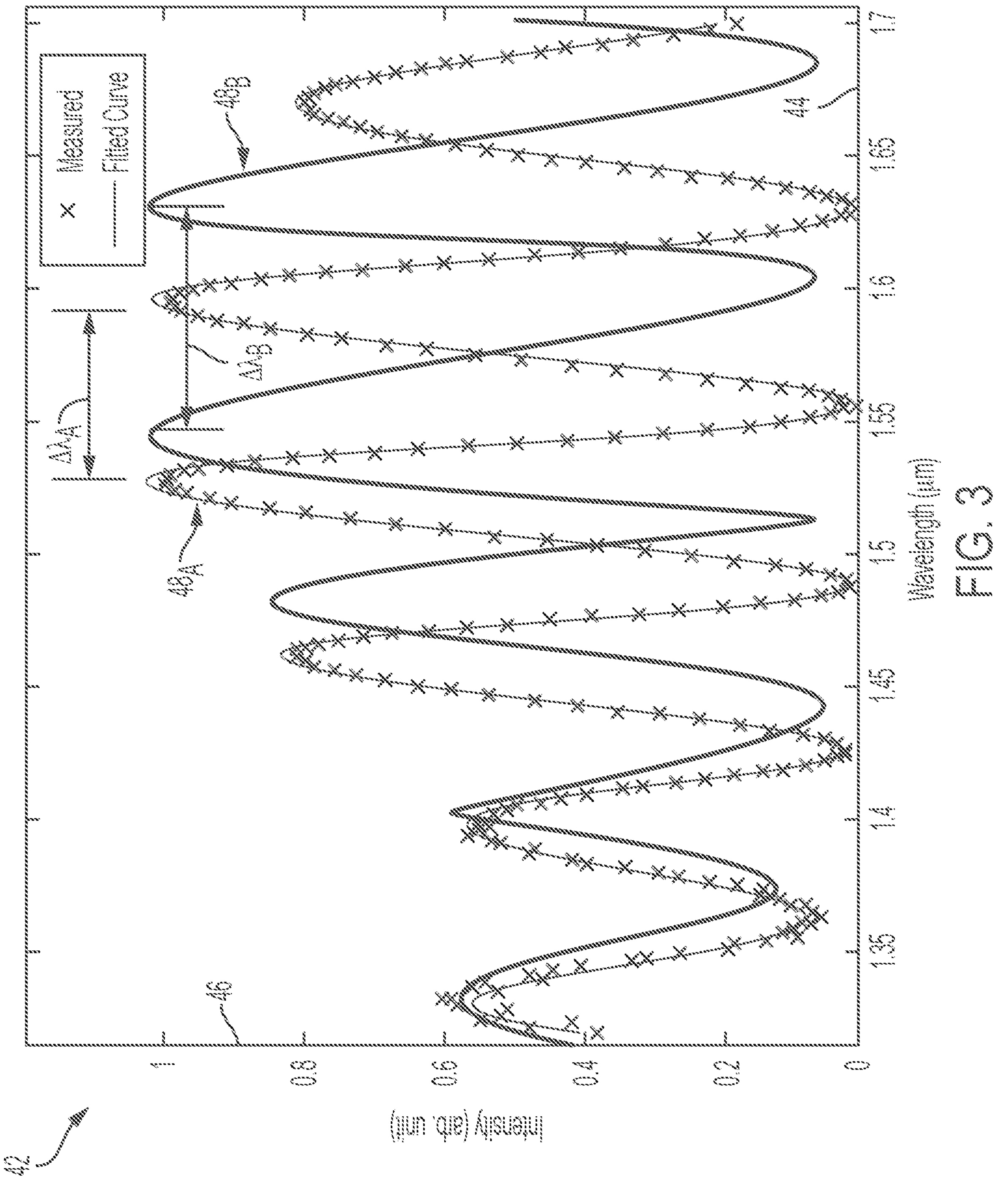
FIG. 3 is graph depicting the wavelength of light reflected from the Fabry-Perot cavity for two different cavity dimensions.

FIG. 3 is graph depicting the spectral response of light reflected from the Fabry-Perot cavity for two different cavity dimensions. In FIG. 3, graph 42 includes horizontal axis 44, vertical axis 46, and amplitude/wavelength relations 48A and 48B. Horizontal axis 44 is indicative of wavelength of light reflected from Fabry-Perot cavity 16 and detected by detector 18. Vertical axis 46 is indicative of amplitude of light reflected from Fabry-Perot cavity 16 and detected by detector 18. Spectral responses 48A and 48B correspond to optical light detected for the two magnetic field conditions that resulted in the cavity dimensions 32A and 32B depicted in FIGS. 2A and 2B, respectively. Spectral response 48A corresponds to the reflected signal when Fabry-Perot cavity 16 has a relatively large cavity dimension 32A (e.g., a dimensional change that is only half a wavelength can be considered relatively large), as depicted in FIG. 2A. At such a relatively large cavity dimension 32A, the spectral response indicates constructive interference occurring at specific wavelengths, such as at peak-amplitude wavelengths $\lambda_1$, $\lambda_3$, and $\lambda_5$. A wavelength difference $\Delta\lambda_A$ between adjacent peaks in spectral response 48A is indicative of cavity dimension 32A. Spectral response 48B corresponds to the detected optical spectral response when Fabry-Perot cavity 16 has a relatively small cavity dimension 32B, as depicted in FIG. 2B. At such a relatively small cavity dimension 32B, the spectral response indicates constructive interference occurring at other specific wavelengths, such as at peak-amplitude wavelengths $\lambda_2$, $\lambda_4$, and $\lambda_6$. A wavelength difference $\Delta\lambda_{AB}$ between adjacent peaks in spectral response 48B is indicative of cavity dimension 32B.

In some embodiments, light source 18 can be a laser that projects light of a single wavelength into Fabry-Perot cavity 16. Detector 18 will then monitor the amplitude of the reflected light of that same wavelength to determine movement of second mirror 28. In such an embodiment, the spectral response is reduced to a single wavelength response, permitting a photodetector, for example, to function as detector 18. In other embodiments, the light source projects a broader spectrum of light, within a band of wavelengths into Fabry-Perot cavity 16. In such embodiments, the detector can determine movement of second mirror 28 by the detection of reflected light of more than a single wavelength. In such embodiments detector 18 can be a spectrum analyzer, for example.

Magnetic field 22, as depicted in FIG. 1, will change in a periodic fashion as teeth 24 of toothed phonic wheel 12 rotates, thereby producing a periodic shift in peak-amplitude wavelengths, such as between peak-amplitude wavelengths $\lambda_1$ and $\lambda_2$. Such periodicity of a detected peak-amplitude wavelength is indicative of the rotation frequency of toothed phonic wheel 12.

Figure 4:
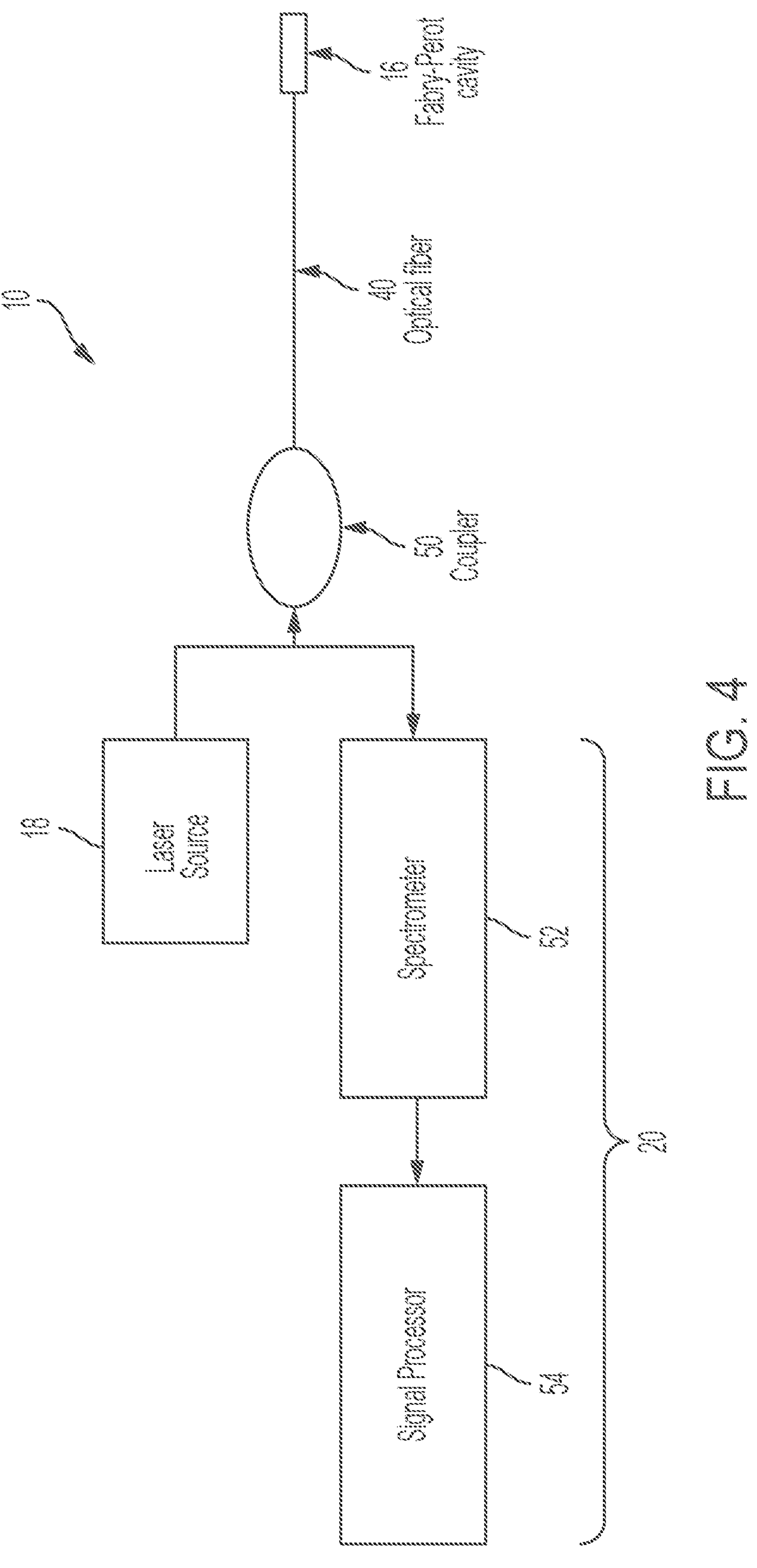
FIG. 4 is a block diagram of an embodiment of a Fabry-Perot based speed sensor.

FIG. 4 is a block diagram of an embodiment of a Fabry-Perot based speed sensor. In FIG. 4, Fabry-Perot based speed sensor 10 is depicted in block diagram format and includes optical coupler 50 which permits a single optical fiber embodiment of Fabry-Perot based speed sensor 10. Optical coupler 50 is configured to perform two functions. First, optical coupler 50 directs the light generated by light source 16 to optical fiber 40, which in turn transmits the light generated to Fabry-Perot cavity 16. Second, optical coupler 50 directs, to spectrometer 52, light reflected from Fabry-Perot cavity 16 as transmitted to detector 20 by optical fiber 40. In the depicted embodiment, detector 20 includes spectrometer 52 and signal processor 54. Spectrometer 52 detects spectral responses of such light reflected by Fabry-Perot cavity 16, as indicated in FIGS. 3A and 3B. Speed calculator 54 can then determine peak-amplitude wavelengths from such spectral responses and determine a rotation frequency indicated by time changes of such peak-amplitude wavelengths (e.g., periodicity of such peak-amplitude wavelengths).

Various embodiments can use more of fewer components are depicted in the embodiments described above with reference to FIGS. 1-4. For example, the speed calculator shown in FIG. 4 can include a any of various kinds of processors as are known in the art, such as, for example, a signal processor, a microprocessor, a programmable logic array, etc. Similarly the light source and/or detector can include any of the various light sources and/or detectors as are known in the art, such as for example a laser diode, an array of laser diodes, a gas laser, a Light Emitting Diode (LED), a Super-luminescent Light Emitting Diode (SLED), etc.

Discussion of Possible Embodiments

The following are non-exclusive descriptions of possible embodiments of the present invention.

Apparatus and associated methods relate to a system for determining rotation frequency of a rotatable member. The system includes a magnet, a Fabry-Perot cavity, a light source, a detector, and a speed calculator. The magnet generates a magnetic field proximate the rotatable member. Rotation of the rotatable member causes changes in the magnetic field generated by the magnet. The Fabry-Perot cavity is formed between a first mirror and a second mirror. The second mirror is bonded to a magneto-strictive material having a thickness dimension that changes in response to changes in the magnetic field caused by rotation of the rotatable member, thereby moving the second mirror relative to the first mirror. The light source is configured to project light into the Fabry-Perot cavity. The detector is configured to detect light reflected from the Fabry-Perot cavity. The speed calculator is configured to determine rotation frequency of the rotatable member based on a principal wavelength of light detected by the detector.

The system of the preceding paragraph can optionally include, additionally and/or alternatively, any one or more of the following features, configurations and/or additional components:

A further embodiment of the foregoing system, wherein the rotatable member can include a toothed phonic wheel aligned proximate the magnet such that changes in position of teeth of the toothed phonic wheel relative to the magnet causes the changes in the magnetic field.

A further embodiment of any of the foregoing systems, wherein the Fabry-Perot cavity can be located between the magnet and the toothed phonic wheel.

A further embodiment of any of the foregoing systems, wherein the Fabry-Perot cavity can be aligned such that the cavity dimension is transverse to a line segment of shortest dimension directed between the magnet and the toothed phonic wheel.

A further embodiment of any of the foregoing systems can further include an optical fiber configured to direct the light projected by the light source into the Fabry-Perot cavity.

A further embodiment of any of the foregoing systems, wherein the optical fiber is further can be configured to direct the light reflected from the Fabry-Perot cavity to the detector.

A further embodiment of any of the foregoing systems, wherein the detector can be either a photo detector or a spectrum analyzer.

A further embodiment of any of the foregoing systems, wherein the Fabry-Perot cavity can have a cavity dimension as measured between the first mirror and the second mirror. A metric of the light detected is determined by the cavity dimension.

A further embodiment of any of the foregoing systems, wherein the cavity dimension changes in response to changes in the thickness dimension of the magneto-strictive material.

A further embodiment of any of the foregoing systems, wherein the first mirror has a coefficient of reflectively between than 0.4 and 0.6.

A further embodiment of any of the foregoing systems, wherein the magnet is a permanent magnet.

Some embodiments relate to a method for determining rotation frequency of a rotatable member. A magnetic field proximate the rotatable member is generated, via a magnet. Rotation of the rotatable member causes changes in the magnetic field generated by the magnet. The second mirror of the Fabry-Perot cavity is moved, via a magneto-strictive material, in response to the changes in the magnetic field caused by rotation of the rotatable member. Light is projected, via a light source, into Fabry-Perot cavity formed between a first mirror and the second mirror. A reflected portion of the light projected into the Fabry-Perot cavity is reflected, via the Fabry-Perot cavity. The light reflected from the Fabry-Perot cavity is detected, via a detector, Rotation frequency of the rotatable member is determined, via a speed calculator, based on a principal wavelength of light detected by the detector.

The method of the preceding paragraph can optionally include, additionally and/or alternatively, any one or more of the following features, configurations and/or additional components:

A further embodiment of the foregoing method, wherein the rotatable member can include a toothed phonic wheel aligned proximate the magnet such that changes in position of teeth of the toothed phonic wheel relative to the magnet causes the changes in the magnetic field.

A further embodiment of any of the foregoing methods, wherein the Fabry-Perot cavity can be located between the magnet and the toothed phonic wheel.

A further embodiment of any of the foregoing methods can further include directing, via an optical fiber, the light projected by the light source into the Fabry-Perot cavity.

A further embodiment of any of the foregoing methods can further include directing, via the optical fiber, the light reflected from the Fabry-Perot cavity to the detector.

A further embodiment of any of the foregoing methods, wherein the Fabry-Perot cavity can have a cavity dimension as measured between the first mirror and the second mirror. A metric of the light detected is determined by the cavity dimension.

A further embodiment of any of the foregoing methods, wherein the cavity dimension changes in response to changes in the thickness dimension of the magneto-strictive material.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for determining rotation frequency of a rotatable member, the system comprising:

a single magnet for generating a magnetic field proximate the rotatable member, rotation of the rotatable member causing changes in the magnetic field generated by the single magnet;

a Fabry-Perot cavity formed between a first mirror and a second mirror, which are parallel to one another, the Fabry-Perot cavity is located directly between the single magnet and the toothed phonic wheel, the second mirror bonded to a magneto-strictive material having a thickness dimension that changes in response to changes in the magnetic field caused by rotation of the rotatable member, thereby moving the second mirror relative to the first mirror;

a light source configured to project light into the Fabry-Perot cavity;

a detector configured to detect light reflected from the Fabry-Perot cavity; and a speed calculator configured to determine rotation frequency of the rotatable member based on a principal wavelength of light detected by the detector.

2. The system of claim 1, wherein the rotatable member includes:

a toothed phonic wheel aligned proximate the single magnet such that changes in position of teeth of the toothed phonic wheel relative to the single magnet causes the changes in the magnetic field.

3. The system of claim 2, wherein the Fabry-Perot cavity is aligned such that a cavity dimension is transverse to a line segment of shortest dimension directed between the single magnet and the toothed phonic wheel.

4. The system of claim 1, further comprising:

an optical fiber configured to direct the light projected by the light source into the Fabry-Perot cavity.

5. The system of claim 4, wherein the optical fiber is further configured to direct the light reflected from the Fabry-Perot cavity to the detector.

6. The system of claim 1, wherein the detector can be either a photo detector or a spectrum analyzer.

7. The system of claim 1, wherein the Fabry-Perot cavity has a cavity dimension as measured between the first mirror and the second mirror, a metric of the light detected is determined by the cavity dimension.

8. The system of claim 7, wherein the cavity dimension changes in response to changes in the thickness dimension of the magneto-strictive material.

9. The system of claim 1, wherein the first mirror has a coefficient of reflectively between than 0.4 and 0.6.

10. The system of claim 1, wherein the single magnet is a permanent magnet.

11. A method for determining rotation frequency of a rotatable member, the method comprising:

generating, via a single magnet, a magnetic field proximate the rotatable member, rotation of the rotatable member causing changes in the magnetic field generated by the single magnet;

moving, via a magneto-strictive material, a second mirror of a Fabry-Perot cavity in response to the changes in the magnetic field caused by rotation of the rotatable member;

projecting, via a light source, light into Fabry-Perot cavity formed between a first mirror and the second mirror, which are parallel to one another and located between the single magnet and the toothed phonic wheel;

reflecting, via the Fabry-Perot cavity, a reflected portion of the light projected into the Fabry-Perot cavity;

detecting, via a detector, the light reflected from the Fabry-Perot cavity; and determining, via a speed calculator, rotation frequency of the rotatable member based on a principal wavelength of light detected by the detector.

12. The method of claim 11, wherein the rotatable member includes:

a toothed phonic wheel aligned proximate the single magnet such that changes in position of teeth of the toothed phonic wheel relative to the single magnet causes the changes in the magnetic field.

13. The method of claim 11, wherein the Fabry-Perot cavity is aligned such that a cavity dimension is transverse to a line segment of shortest dimension directed between the single magnet and the toothed phonic wheel.

14. The method of claim 11, further comprising:

directing, via an optical fiber, the light projected by the light source into the Fabry-Perot cavity.

15. The method of claim 14, further comprising:

directing, via the optical fiber, the light reflected from the Fabry-Perot cavity to the detector.

16. The method of claim 14, wherein the optical fiber is a first optical fiber, the method further comprising:

directing, via a second optical fiber, the light reflected from the Fabry-Perot cavity to the detector.

17. The method of claim 11, wherein the Fabry-Perot cavity has a cavity dimension as measured between the first mirror and the second mirror, a metric of the light detected is determined by the cavity dimension.

18. The method of claim 17, wherein the cavity dimension changes in response to changes in the thickness dimension of the magneto-strictive material.

* * * * *